(12) United States Patent
Kahn et al.

(10) Patent No.: US 9,979,996 B2
(45) Date of Patent: May 22, 2018

(54) METHOD AND SYSTEM FOR OPERATING A MULTI-ROOM DIGITAL VIDEO RECORDING SYSTEM

(71) Applicant: The DIRECTV Group, Inc., El Segundo, CA (US)

(72) Inventors: Raynold M. Kahn, Los Angeles, CA (US); Steven Kasakitis, Redondo Beach, CA (US); Christopher R. Roy, Los Angeles, CA (US); Erin K. Nelson, Torrance, CA (US); Christopher J. Cabanne, Woodland Hills, CA (US); Luke J. Crook, San Pedro, CA (US); Gregory Vagnati, Los Angeles, CA (US); Noreen Fong, Cerritos, CA (US); Eric J. Bennett, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days. days.

(21) Appl. No.: 15/229,610

(22) Filed: Aug. 5, 2016

(65) Prior Publication Data
US 2016/0345046 A1    Nov. 24, 2016

Related U.S. Application Data

(63) Continuation of application No. 12/648,344, filed on Dec. 29, 2009, now abandoned.

(51) Int. Cl.
*H04N 21/426* (2011.01)
*H04N 21/2385* (2011.01)
(Continued)

(52) U.S. Cl.
CPC ..... *H04N 21/4263* (2013.01); *H04N 21/2385* (2013.01); *H04N 21/433* (2013.01);
(Continued)

(58) Field of Classification Search
CPC .......... H04N 21/4263; H04N 21/2385; H04N 21/433; H04N 21/4334; H04N 21/436;
(Continued)

(56) References Cited

U.S. PATENT DOCUMENTS

| 7,380,264 B2 * | 5/2008 | Potrebic | ............. H04N 21/4263 |
| | | | 348/E5.007 |
| 7,689,995 B1 * | 3/2010 | Francis | ............. H04N 21/4147 |
| | | | 718/104 |

(Continued)

OTHER PUBLICATIONS

Office Action regarding Mexican Patent Application No. MX/a/2012/007562 dated Jul. 26, 2013.

*Primary Examiner* — Randy A Flynn
(74) *Attorney, Agent, or Firm* — Harness, Dickey & Pierce, PLC

(57) ABSTRACT

A system and method for allocating tuner resources in a multi-room digital video recording system, wherein the system includes a server device having a plurality of tuners therein and a first client device in communication with the server device and allocated at least a first tuner from the plurality of tuners. A second client in communication client device generates a tuner request. The server device allocates the first tuner to the second user device and communicates a content signal through the first tuner to the second client device.

42 Claims, 16 Drawing Sheets

(51) Int. Cl.
*H04N 21/433* (2011.01)
*H04N 21/436* (2011.01)
*H04N 21/458* (2011.01)
*H04N 21/472* (2011.01)

(52) U.S. Cl.
CPC ....... *H04N 21/436* (2013.01); *H04N 21/4334* (2013.01); *H04N 21/458* (2013.01); *H04N 21/4583* (2013.01); *H04N 21/472* (2013.01)

(58) Field of Classification Search
CPC . H04N 21/458; H04N 21/4583; H04N 21/472
See application file for complete search history.

(56) References Cited

U.S. PATENT DOCUMENTS

| | | | | |
|---|---|---|---|---|
| 7,917,008 | B1* | 3/2011 | Lee | H04N 21/4334 386/291 |
| 8,116,611 | B2* | 2/2012 | Bumgardner | H04N 21/443 386/291 |
| 2003/0072559 | A1* | 4/2003 | Van Haver | H04N 5/782 386/247 |
| 2003/0086023 | A1* | 5/2003 | Chung | H04N 21/42684 348/714 |
| 2004/0218905 | A1* | 11/2004 | Green | H04N 21/4263 386/243 |
| 2005/0005300 | A1* | 1/2005 | Putterman | H04N 21/4263 725/89 |
| 2005/0235323 | A1* | 10/2005 | Ellis | H04N 21/4135 725/58 |
| 2005/0251750 | A1* | 11/2005 | Vallone | H04N 5/76 715/721 |
| 2006/0037048 | A1* | 2/2006 | DeYonker | H04N 21/4334 725/58 |
| 2006/0195873 | A1* | 8/2006 | Gopalan | H04N 21/4263 725/100 |
| 2008/0034391 | A1* | 2/2008 | Lehman | H04N 21/4335 725/59 |
| 2008/0063381 | A1* | 3/2008 | Conroy | H04N 21/4753 386/234 |
| 2008/0166103 | A1* | 7/2008 | Tajime | H04N 21/47214 386/253 |
| 2008/0276284 | A1* | 11/2008 | Bumgardner | H04N 21/4334 725/58 |
| 2009/0007184 | A1* | 1/2009 | Nakamura | H04N 21/4143 725/58 |
| 2009/0037953 | A1* | 2/2009 | Roth | H04N 5/782 725/39 |
| 2009/0222875 | A1 | 9/2009 | Cheng et al. | |
| 2010/0319038 | A1* | 12/2010 | Devassykutty | H04N 21/43615 725/82 |

* cited by examiner

METHOD AND SYSTEM FOR OPERATING A MULTI-ROOM DIGITAL VIDEO RECORDING SYSTEM

CROSS-REFERENCE TO RELATED APPLICATIONS

This application is a continuation of U.S. application Ser. No. 12/648,344 filed on Dec. 29, 2009. The entire disclosure of the above application is incorporated herein by reference herein.

TECHNICAL FIELD

The present disclosure relates generally to a multi-room digital video recording system, and, more specifically, to providing a system for tuner allocation in the multi-room digital video recording system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

Because each electronic device receives the signals and also processes the signals, the customer experiences at each of the electronic devices may be slightly different. Consistency and the quality that the customer perceives at each device are important for providing a consistent customer experience.

Providing multi-room digital video recording is important to content providers. Many systems, however, have permanent allocation of resources to a particular device or location. In many situations, it may be desirable to provide many resources to one location while allocating relatively few resources to another location.

SUMMARY

The present disclosure provides a method and system for allocating times in a multi-room digital video recording system.

In one aspect of the disclosure, a method includes allocating a first tuner of a plurality of tuners to a first client device, generating a tuner request at the second client device, communicating the tuner request from the second client device to the server, reallocating the first tuner to the second client device in response to the tuner request and communicating a content signal through the first tuner to the second client device.

In another aspect of the disclosure, a method includes allocating a first tuner of a plurality of tuners to a first client device, generating a tuner request at the first device, communicating the tuner request from the first client device to the server device, allocating a second tuner to the first client device and communicating content signals through the first tuner and the second tuner to the first client device.

In yet another aspect of the disclosure, a system includes a server device having a plurality of tuners therein and a first client device in communication with the server device and allocated at least a first tuner from the plurality of tuners. A second client in communication with the server that generates a tuner request. The server device allocates the first tuner to the second user device and communicates a content signal through the first tuner to the second client device.

In a further aspect of the disclosure, a system includes a server device having a plurality of tuners therein and a first client device in communication with the server and allocated at least a first tuner from the plurality of tuners and generating a tuner request. The server device allocates at least a second tuner from the plurality of tuners in response to the tuner request. The server device communicates content signals through the first tuner and the second tuner to the first client device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
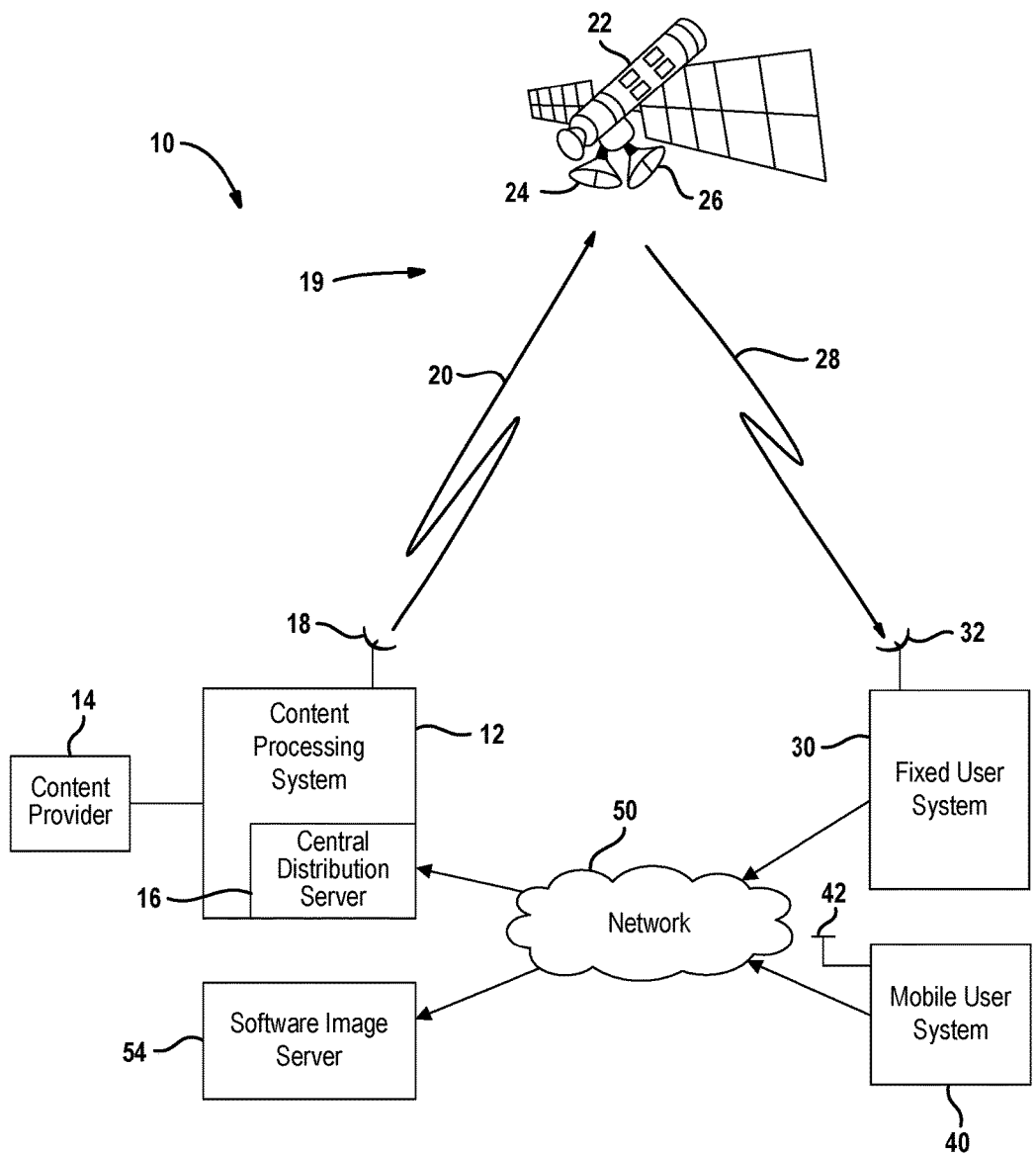
FIG. 1 is a high level block diagrammatic view of a satellite distribution system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol-(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
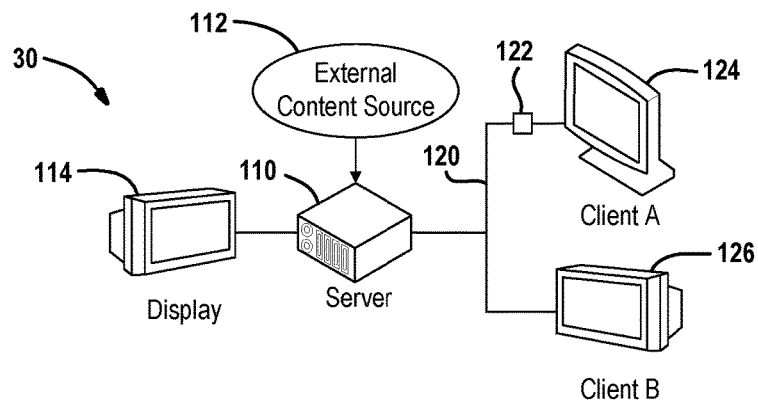
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
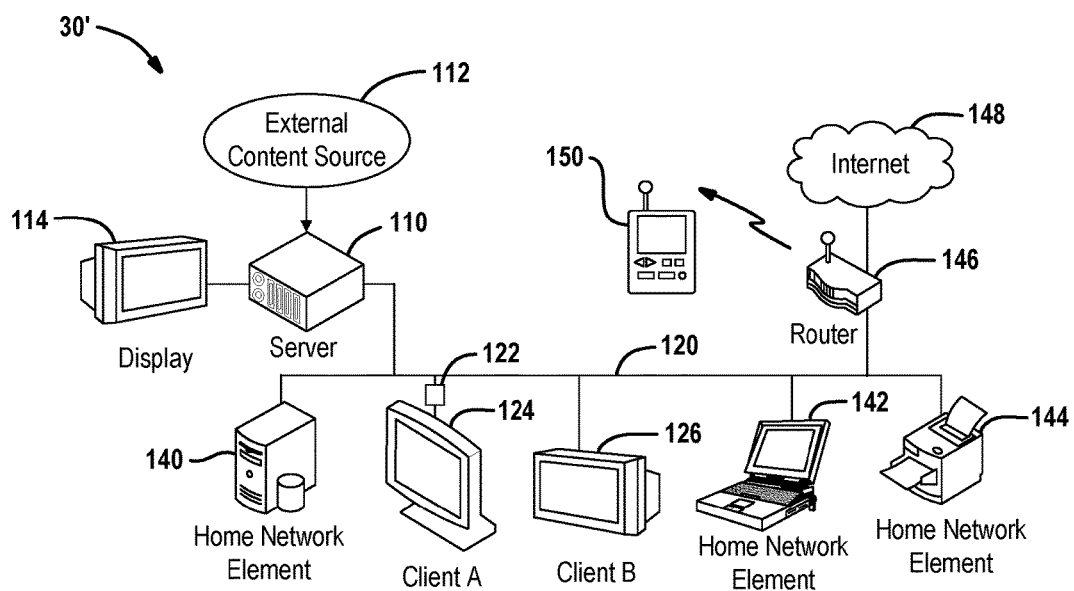
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
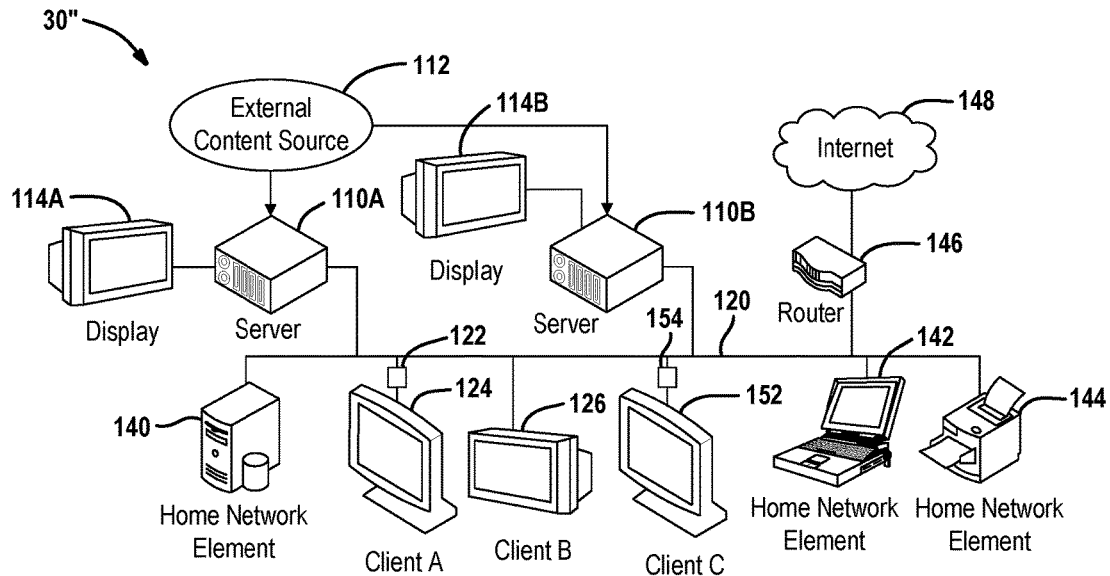
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
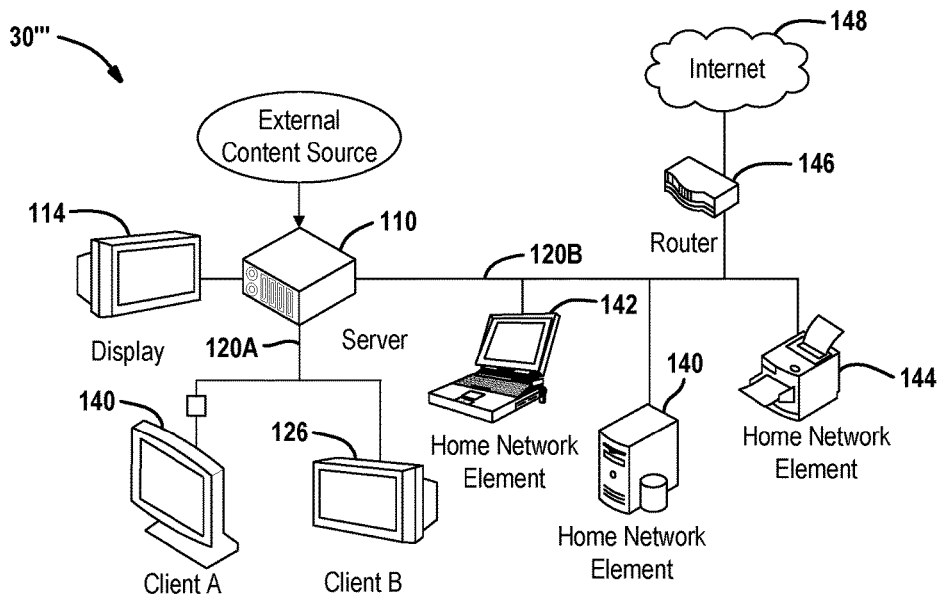
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
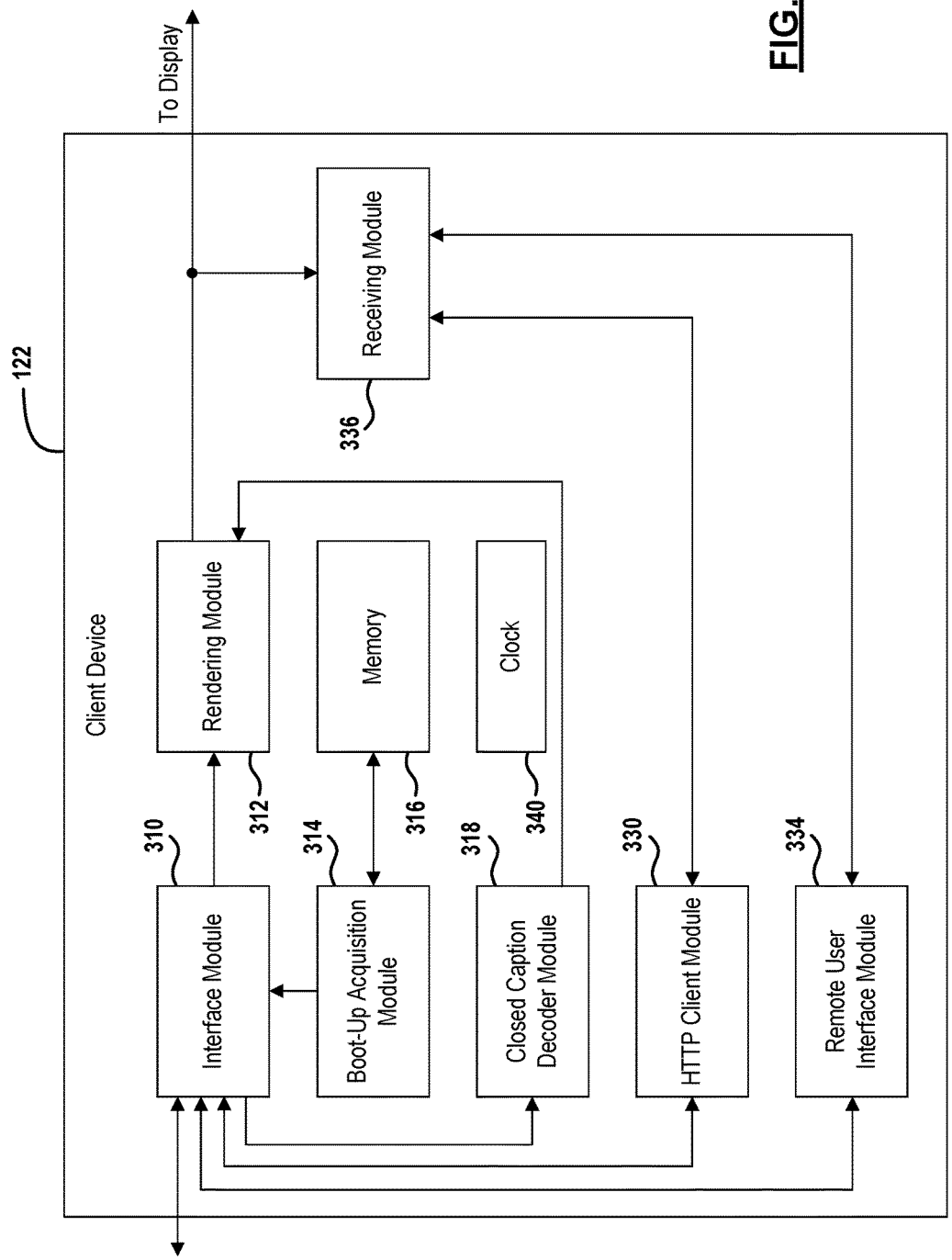
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. The rendering module 312 will allow consistent customer experiences at various client devices. The rendering module 312 communicates rendered signals to the display of the device or an external display.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and audio and video to provide a full featured user interface within the client. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
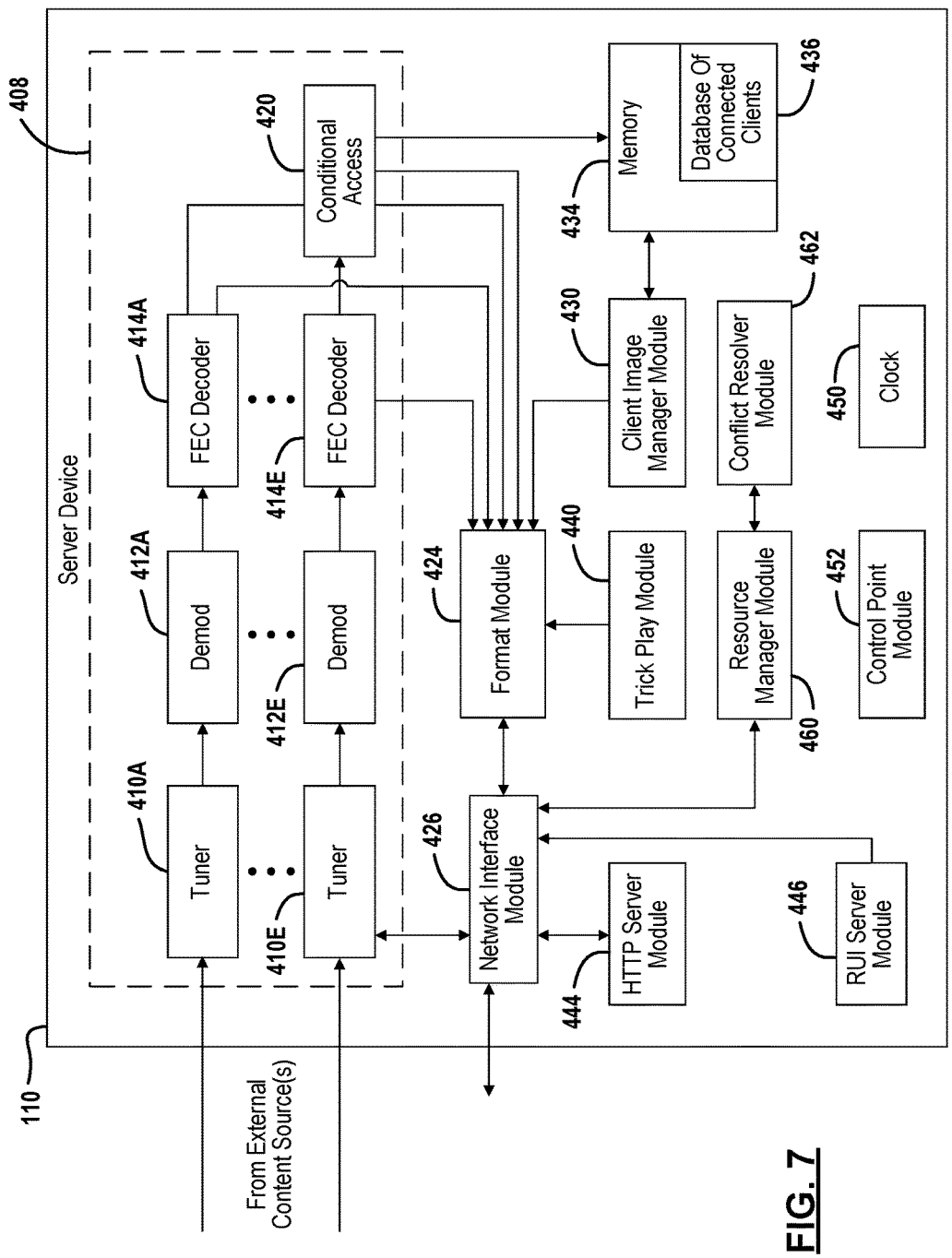
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a plurality of tuners 410A-E, a plurality of demodulators 412A-E, a plurality of forward error correction decoders 414A-e and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display. The network interface module 426 may also be used for receiving signals from a client device or devices.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

The server device 110 may also include a resource manager module 460 that is in communication with a conflict resolver module 462. The resource manager module 460 may be in communication with a network interface module 426. The network interface module 426 may receive signals such as control signals or selection signals from various client devices. The resource manager module 460 may identify when a conflict arises from a conflict-causing request received from one of the client devices.

A conflict may arise when a concurrent view or service activity requires more resources than those available at the server device.

As will be further described below, the resource manager module 460 may generate a set of "sufficient sets." The sufficient sets may be provided to the conflict resolver module 462. The resource manager module 460 or the conflict resolver module 462 may then determine a course of action to follow for the encountered conflict. The conflict resolver module 462 may consider the type of activity generating the conflict-causing request versus the activities in the set of sufficient sets. The conflict resolver module 462 returns sufficient sets sorted according to the requirements of the system. The resource manager module 460 may thus resolve the conflict according to the sufficient sets and prompt the user of a client device for an input, if required. The conflict resolver module 462 may resolve conflicts between various aspects of the operation of the server, including tuner conflicts as will be described below.

Figure 8:
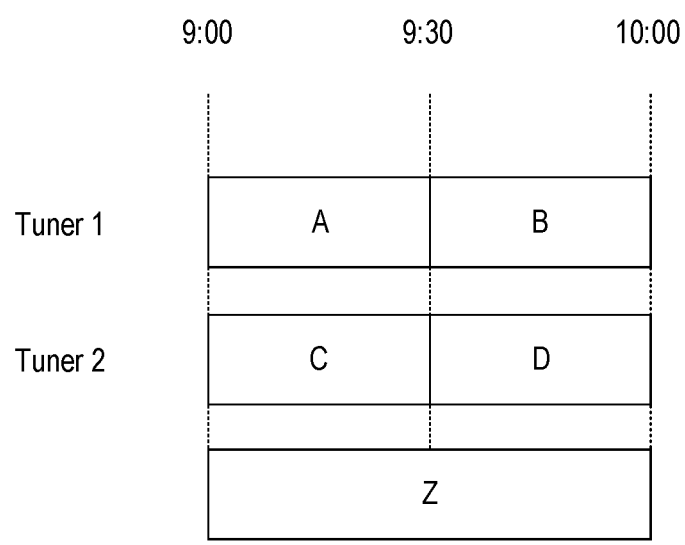
FIG. 8 is a block diagrammatic view of a tuner conflict situation.

Referring now to FIG. 8, a method for resolving conflicts using the conflict resolver is set forth. It should be noted that a sufficient set is described. A sufficient set consists of one or more activities that conflict with requesting activity over the time frame of the requesting activity. Each sufficient set may consist of a set of activities that, if cancelled, would free sufficient resources to resolve the resource conflict for the requesting activity. As is illustrated in FIG. 8, first program A is programmed to be recorded between 9:00 and 9:30; program B is programmed to be recorded between 9:30 and 10:00 on tuner 1. Tuner 2 includes program C between 9:00 and 9:30; and program D is programmed to record between 9:30 and 10:00. A requesting activity such as program Z which would record between 9:00 and 10:00 is requested. A set of sufficient sets to resolve the conflict of the requesting activity may include AB, AD, CD, or CB. The cancellation of any one of these sufficient sets will result in the conflict being resolved and a tuner being available for recording content E. The conflicts may be displayed in a conflict user interface such as that illustrated above in FIGS. 12 and 13.

Figure 9:
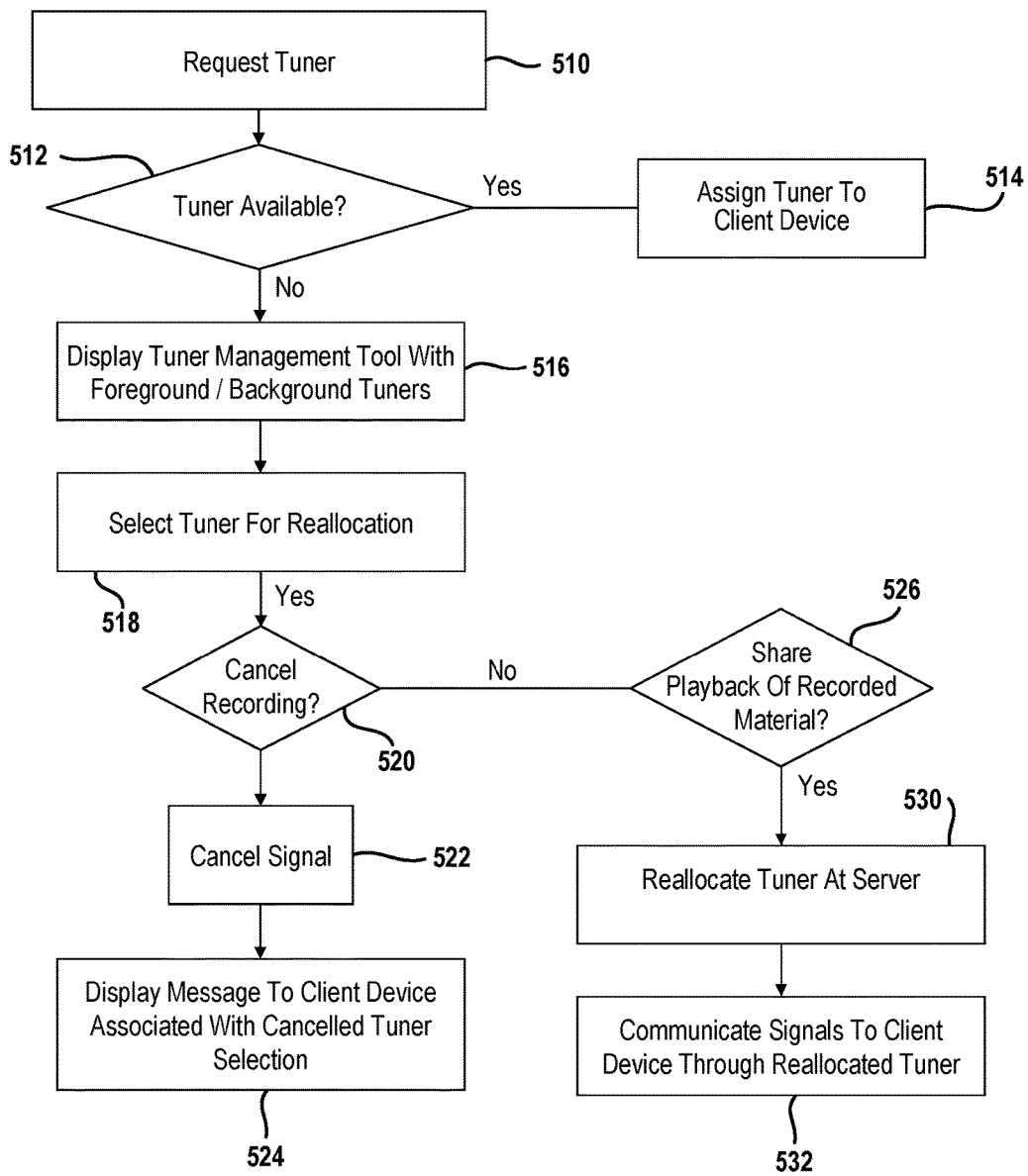
FIG. 9 is a flowchart of a first method for assigning a tuner.

Referring now to FIG. 9, a method for resolving conflicts with tuners within the server device is set forth. A tuner is requested by a client device or a service associated with the server device. It should be noted that the tuners within the server device may be allocated on an as-needed basis. Multiple tuners may be allocated to a client device under various conditions. One example of multiple tuners being allocated to one client device is for picture-in-picture (PIP). PIP allows two different content streams to be displayed at any one time. The picture-in-picture display may have one picture being larger than another picture. The foreground tuner may be responsible for the larger picture, while a background tuner may be responsible for the smaller picture. The picture-in-picture configuration may also provide side-by-side pictures in the display, or the like. One or both of the foreground tuner and background tuner may also be used for recording content within the server device in addition to displaying the signal. The tuner request signal of step 510 may be a tuner request from a client device that already has an allocated tuner or from a second client device that has no tuner allocated or at least one tuner allocated. The tuner request may comprise many different types of requests, including a channel selection, a record selection, or a live TV selection. Another way in which the tuner request may be generated is by requesting a dual live buffer (DLB). The dual live buffer may provide live content through more than one tuner to a client device in response to a dual live buffer request.

In step 512, it is determined whether or not a tuner is available. If a tuner is available, meaning the tuner has not been pre-assigned, one of the plurality of tuners that is available is assigned in step 514. It should be noted that when a tuner is available, an available tuner may be automatically assigned to the client device. It should be noted also that the tuner request may be from a first client device that already has a tuner allocated or from a second client device that may or may not have a tuner allocated. The system may thus automatically assign a tuner from the plurality of tuners available.

Referring back to step 512, when a tuner is not available, a conflict mode may be entered. In step 516, a tuner management tool that displays the tuner status for different tuners may be displayed through an on-screen display (OSD) at a client device. The on-screen display may be generated at the server device. The tuner management on-screen display (OSD) will be described further below and may include the location, the title of the recording content and the recording state. When live TV is being used by a tuner associated with another client device, the words "live TV" or something similar may be used as an identifier rather than the actual content. The tuner associated with live TV may thus be made unavailable. In step 518, a tuner may be selected by the user for reallocation. By selecting a tuner for cancelling a recording, step 520 may be performed. If a tuner is cancelled for recording in step 520, step 522 may be performed which generates a cancel request for the tuner. After step 522, step 524 may generate an on-screen message to the client device associated with the cancelled tuner selection.

Referring back to step 520, if a recording is not to be cancelled, step 526 may share playback of recorded content. After step 526 and after step 524, step 530 may be performed. In step 530, the selected tuner may be reallocated or shared as in the case of step 526. After step 530, step 532 may communicate signals that include content or channel broadcasts to the client device through the reallocated tuner. The content signals may then be displayed on the display device associated with the client devices.

Figure 10:
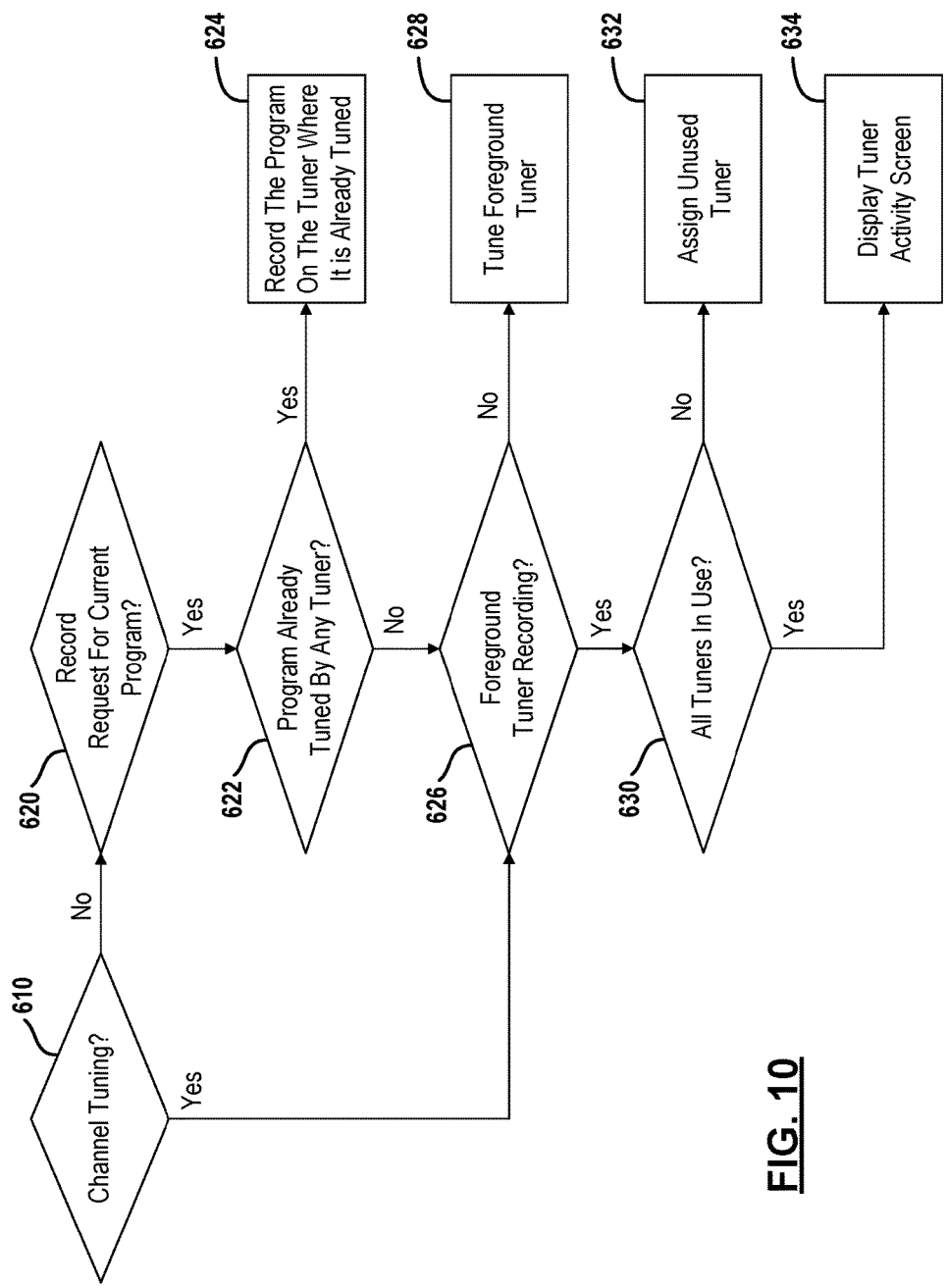
FIG. 10 is a flowchart of a second method for assigning the tuner.

Referring now to FIG. 10, a method for resolving conflicts is set forth. In step 610, it is determined whether or not an attempt to tune to a channel from a client device is performed. If tuning is being performed, step 626 is performed. In step 626, it is determined whether the currently used foreground tuner allocated to the client device is recording. If the currently used foreground tuner is not recording, step 628 tunes the foreground tuner to the desired channel. In step 626, when the currently used tuner is recording, step 630 determines whether all tuners are in use. If all tuners are not in use, step 632 assigns a tuner that is not being used. The assignment of an unused tuner may take place automatically.

In step 630, when all the tuners are in use, and no other tuners are available, a tuner activity screen is displayed in step 634. The tuner activity screen will be described below. The tuner activity screen may provide an opportunity for a user to cancel a recording so that a tuning request and consequently a tuner may be assigned to the tuning request. The tuner activity screen may also provide an opportunity for a user to re-assign a tuner that is assigned to another user, but is not being actively viewed by the other user. An example of a tuner activity screen is provided below.

Referring back to step 610, when the tuner is not generating a tuning request, it is determined whether a recording request for a current program is being generated in step 620. In step 620, when a record request for a current program is being generated, step 622 determines whether the recording request is for a program that is already tuned by any tuner. In step 622, when the program is already tuned by a tuner, step 624 starts a recording of that program on that tuner, including any earlier part of the program in the existing buffer of that tuner. In step 622, when the program is not already tuned by any tuner, then a tuner is needed for tuning and recording the desired program. The same steps (626-634) are then followed, as previously described, to assign a tuner for tuning to the channel, and then to start recording the desired program.

Figure 11:
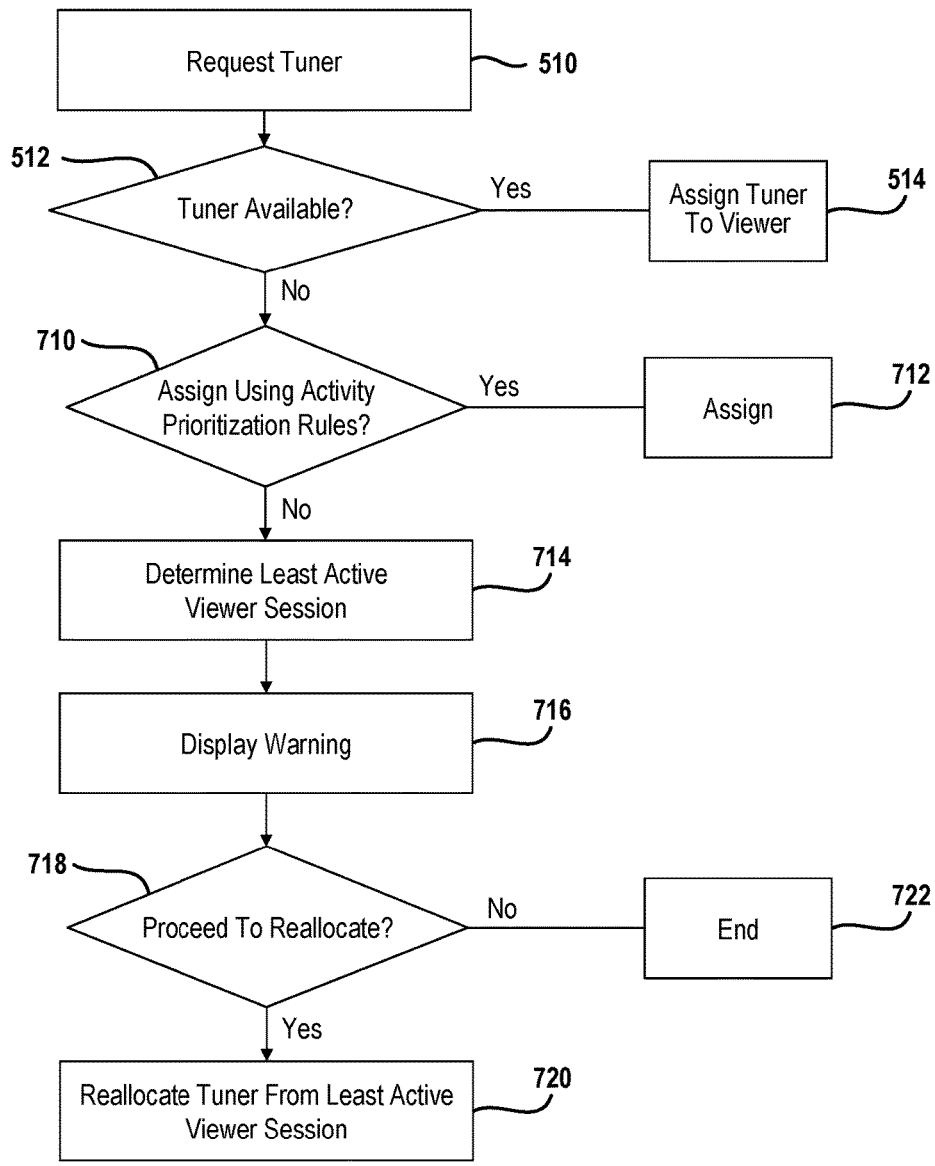
FIG. 11 is a flowchart of a third method for assigning the tuner.

Referring now to FIG. 11, the system may also be configured to automatically assign when activity priority rules cannot be performed. Steps 510-514 of FIG. 9 may be first performed to determine whether a tuner is available. When a tuner is not available in step 512, step 710 determines whether activity prioritization rules are available. If activity prioritization rules are available, the system may automatically assign a tuner in step 712. In step 710, when the system is not able to automatically assign a tuner because of existing recordings or active tuner sessions, step 714 determines the least active viewer session. In step 716, an on-screen display may generate a user warning so that a user of a client device may determine whether to cancel a recording. In step 718, the user device may determine whether to proceed to perform a tuner reallocation based upon a user selection. When a user selects reallocation in step 718, step 720 is performed. In step 720, a tuner is reallocated from the least active viewer session.

Referring back to step 718, when the user does not desire to reallocate a tuner, the system ends without reallocating a tuner in step 722.

Figure 12:
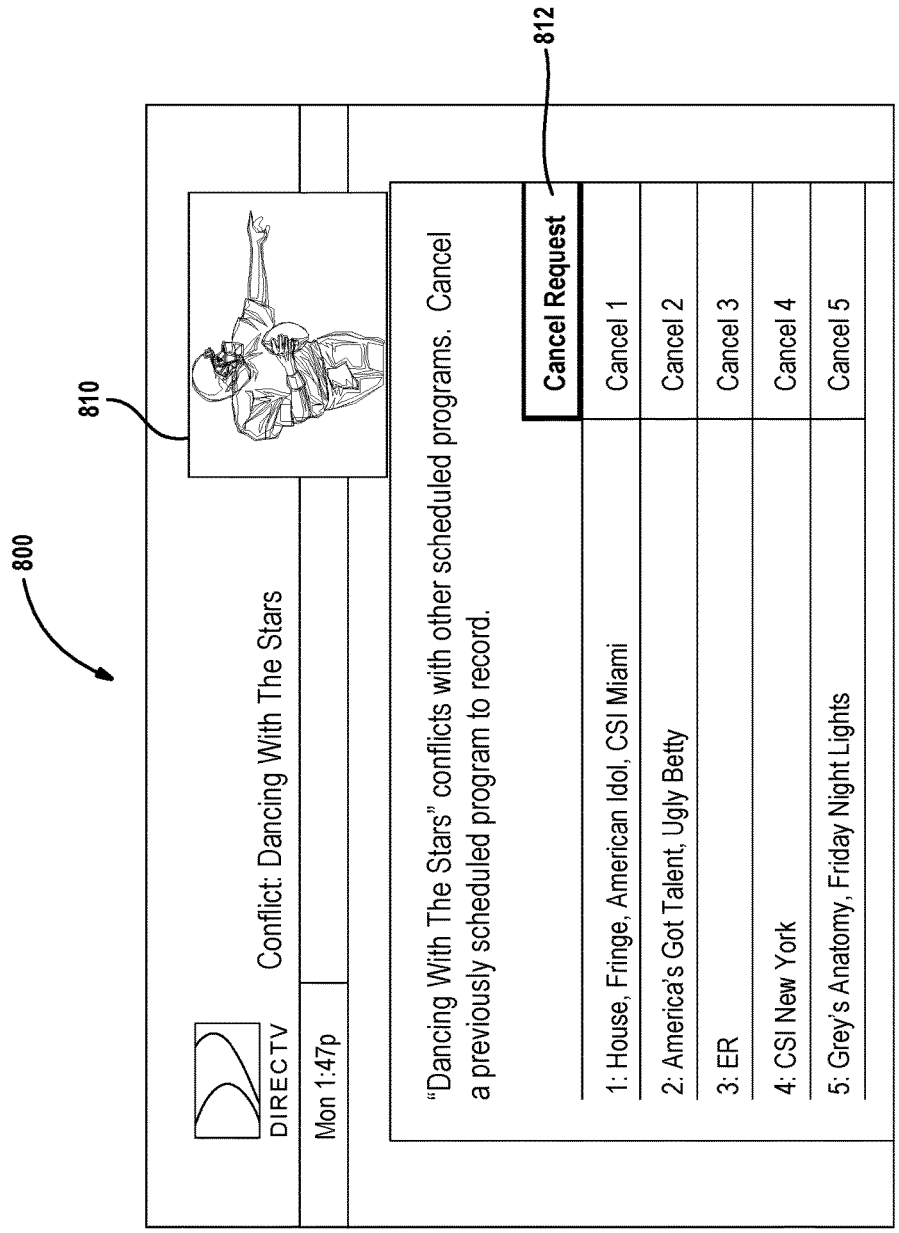
FIG. 12 is a first representational screen view of a conflict screen.

Referring now to FIG. 12, a graphical user interface 800 for a screen display associated with a client device is set forth. The graphical user interface 800 illustrates a conflict screen that may be provided when previously scheduled programs are set to record. In this example, five conflicts numbered 1-5 are provided. Multiple titles are provided for each conflict. In this example, "Dancing with the Stars" is the currently selected item ready to be recorded. The five items listed prevent the program "Dancing with the Stars" from being recorded because a tuner is not available. The graphical user interface may have a picture window 810 for displaying the currently displayed channel. A cancel request selector 812 may also be provided on the screen. As is illustrated, the cancel request selector 812 is a different color than the cancel request boxes cancel 1-cancel 5. By using a remote user interface such as a remote control, one of the boxes cancel 1-cancel 5 may be selected or the cancel request box 812 may also be selected.

Figure 13:
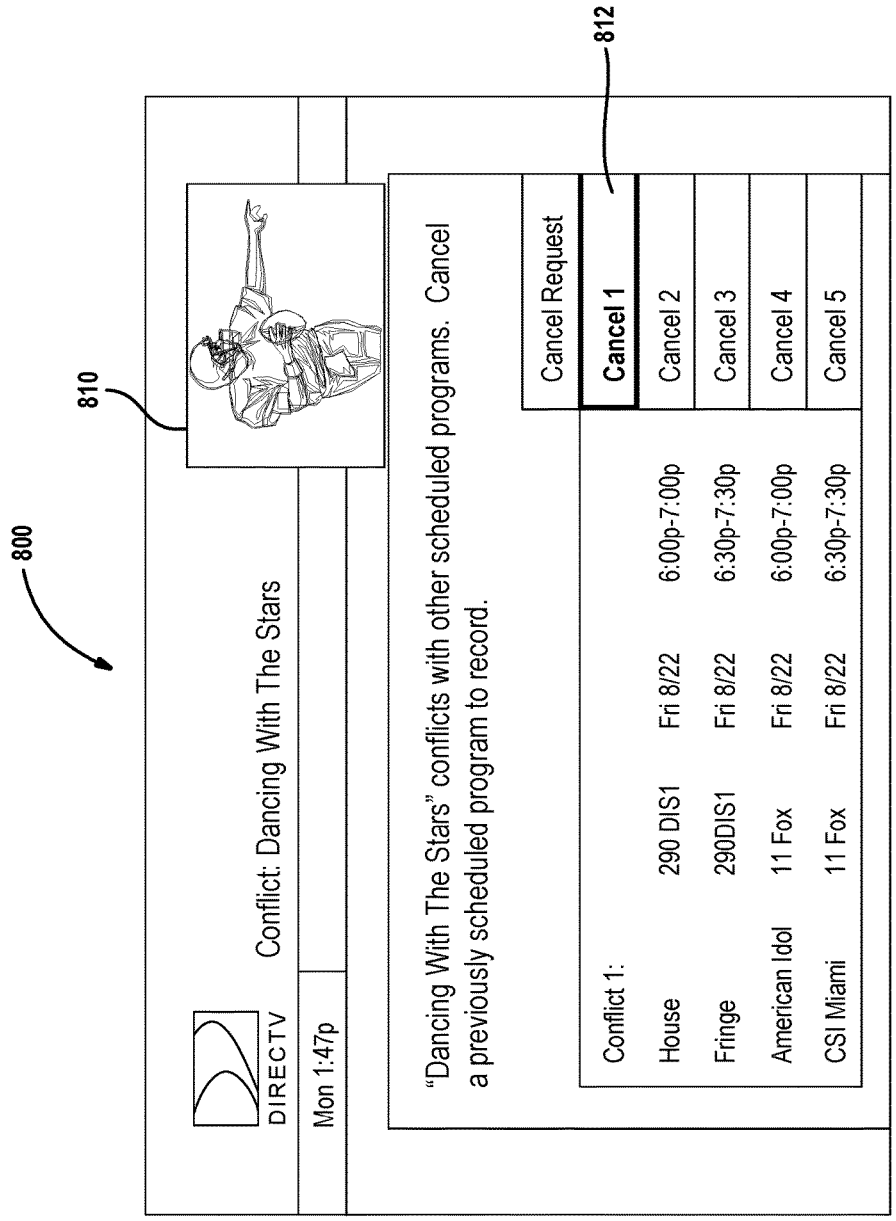
FIG. 13 is a second representational screen view of a conflict screen.

Referring now to FIG. 13, when the selector icon is moved to one of the cancel requests, details for the cancel request may be provided. In this example, the title, the channel and network, the date, the day, and the time may all be provided for the first conflict. By moving the selector to different cancel boxes, the different conflicting programs may be displayed. FIGS. 12 and 13 correspond to recording conflicts.

Figure 14:
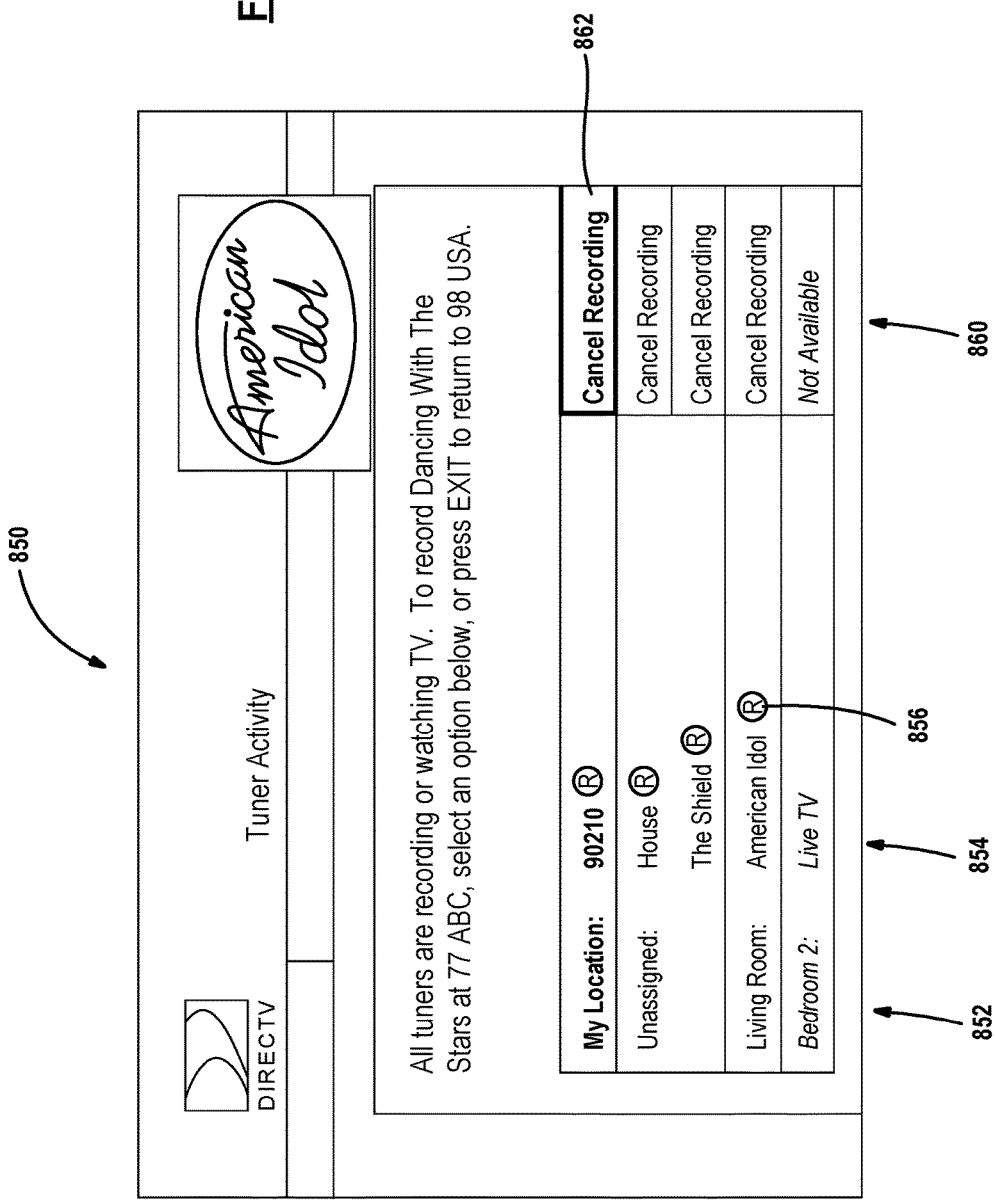
FIG. 14 is a first representational screen view of a tuner activity screen.
Figure 15:
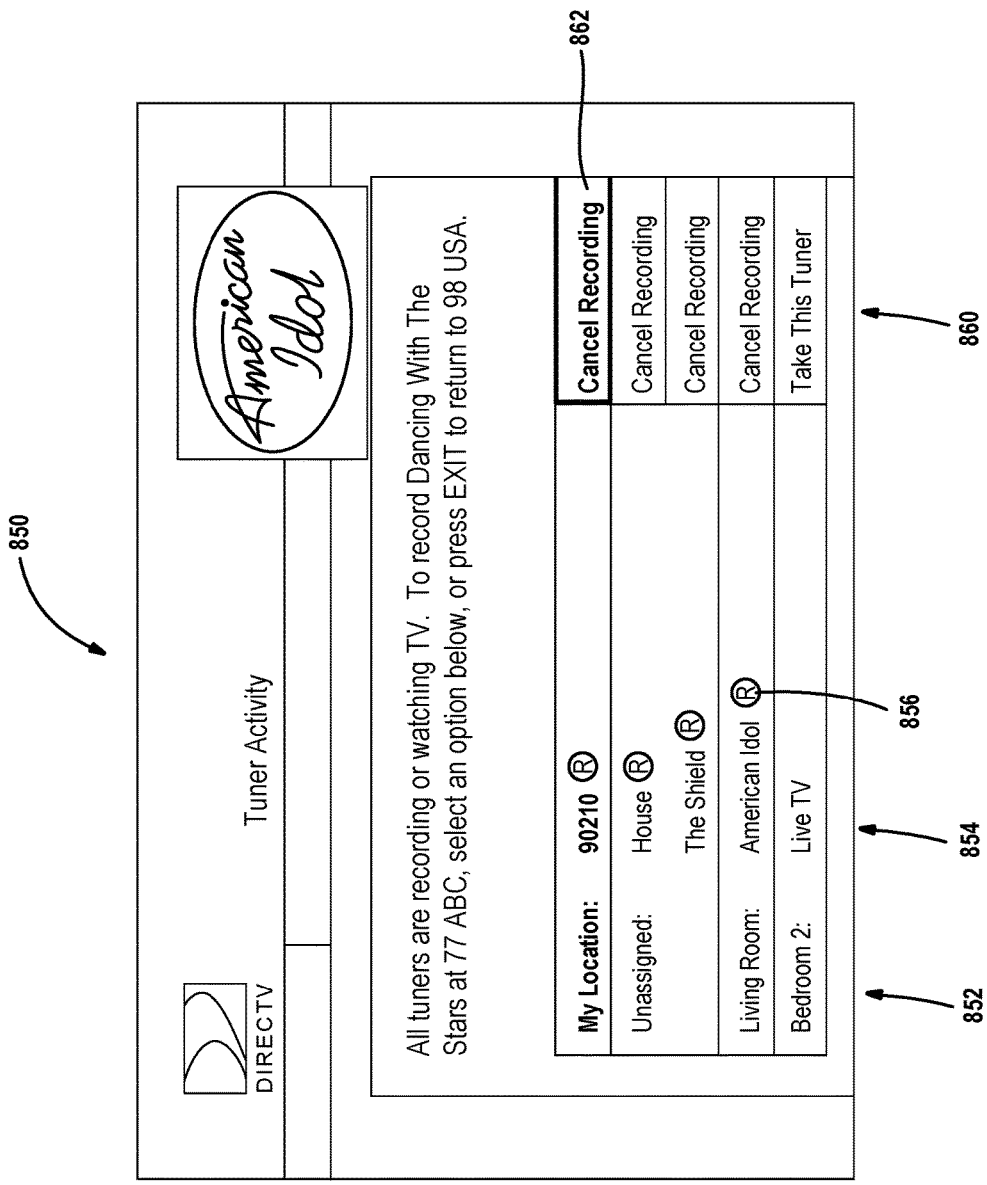
FIG. 15 is a second representational screen view of a tuner activity screen.

Referring now to FIGS. 14 and 15, a graphical user interface 850 is illustrated. The graphical user interface may be used for selecting a tuner and displaying tuner activity. As is illustrated, a location column 852 is provided as well as a title column 854. Next to each title, a record indicator is provided which indicates to the user that the title is currently recording. It should be noted that under column 854, when a tuner assigned to a room or client device, only a "live TV" indicator is provided to protect privacy.

A status column 860 may also be provided which will allow a user to cancel a recording for another tuner. A selector 862 may be scrolled up and down and selected using a user interface such as a remote control. Under certain conditions, a live TV tuner may not be available as is illustrated in FIG. 14. However, in FIG. 15 the live TV tuner is available. By cancelling the recording, another selected recording may be programmed.

Figure 16:
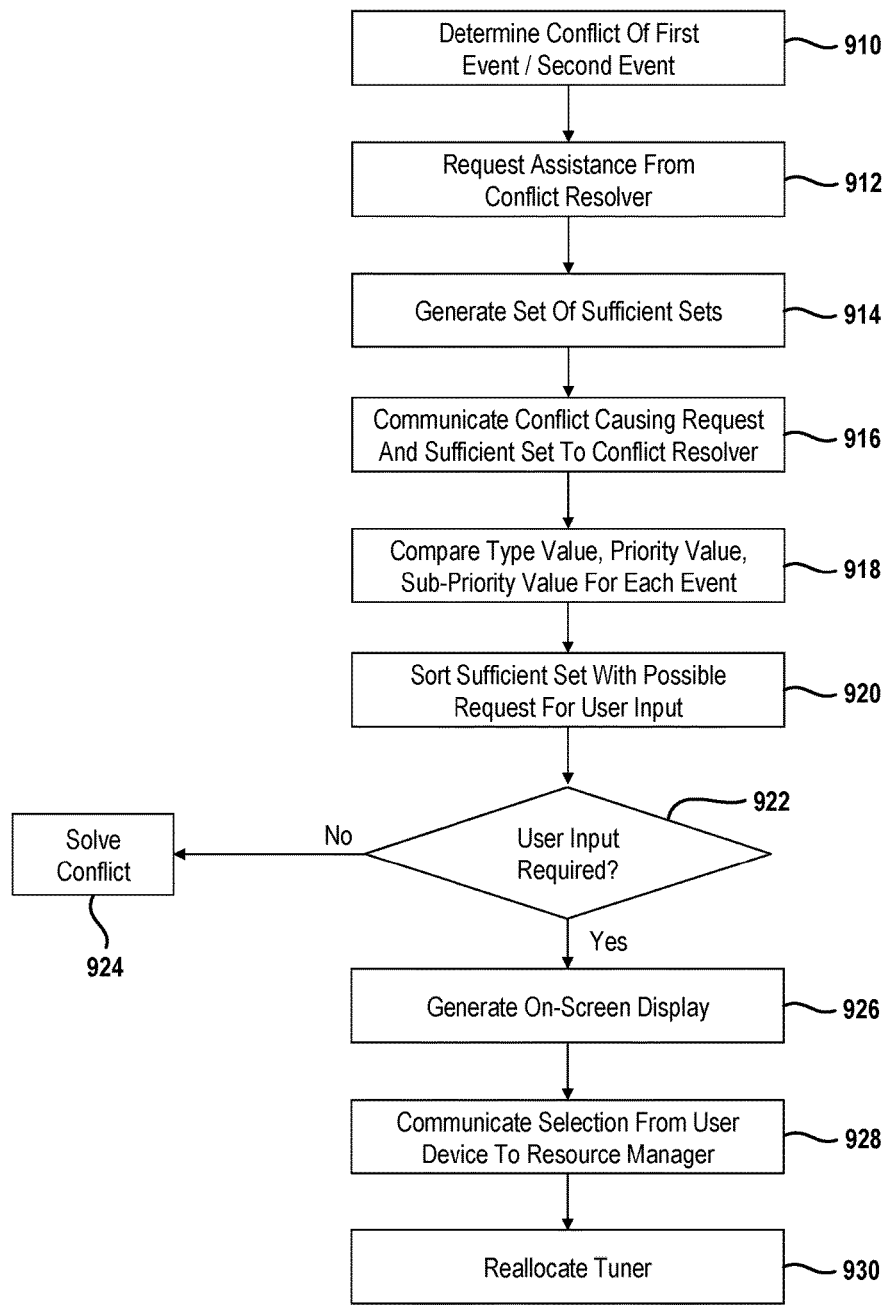
FIG. 16 is a flowchart of a fourth method for assigning the tuner.

Referring now to FIG. 16, a method for performing conflict resolution is illustrated. In step 910, a conflict of a first event and a second event is determined by the resource manager in response to a conflict-causing request by one of the client devices. The resource manage may determine that assistance is required from a conflict resolver in step 912. In step 914, a set of sufficient sets is generated. The set of sufficient sets was described above in FIG. 8.

In step 916, the conflict-causing request and the set of sufficient sets is communicated to the conflict resolver.

In step 918, the conflict may be resolved by determining a type value, priority value, and a sub-priority value for each event. Of course, other types of rankings may be provided to provide scores. The server device may automatically resolve a conflict based upon the scores. However, should a conflict not be resolved by the conflict resolver, a list of conflicting events sorted in a priority from high to low may be presented to a viewer. Different types of activities for different systems may have different priority levels. For example, the highest priority level in the present example is a frequency translation module. The frequency translation module performs a mandatory download as well as performs a reset of the flash memory. The client device acquires the frequency translation module image and stores it within the device. Of course, other mandatory downloads may also be or may also receive a higher priority ranking. The type of such recordings may be high and the priority may also be high. The sub-priority value may also be high for these mandatory downloads. Other types of events, such as set top box upgrades, may also be ranked according to future and immediate upgrades. Client terminal booting, signal strength tests, program guide boot requests, mandatory network pushes, playback of live TV, picture-in-picture requests, one-time pay-per-view recording, one-time non-pay-per-view recordings, recurring recordings, optional upgrade recordings and various types of buffers may all be ranked with a type, priority and sub-priority. The type, priority and sub-priority values may be set by the system designers. Various systems may have various priorities and sub-priorities according to customer and engineering needs.

In step 920, the set of sufficient sets is sorted according to the type value, priority value and sub-priority value. In step 922 it is determined whether user input is required. If user input is not required, step 924 solves the conflict by reassigning a tuner or not reassigning a tuner based upon the values. In step 922, if user input is required, an on-screen display may be generated in step 926. After step 926, step 928 communicates a selection from the user device to the resource manager from the client device. A selection signal may be generated at the client device in response to the on-screen display generated in step 926. In step 930, a tuner may be re-allocated based upon the selection from the client device in step 928. Of course, the tuners may not be reallocated based upon a selection.

Figure 17:
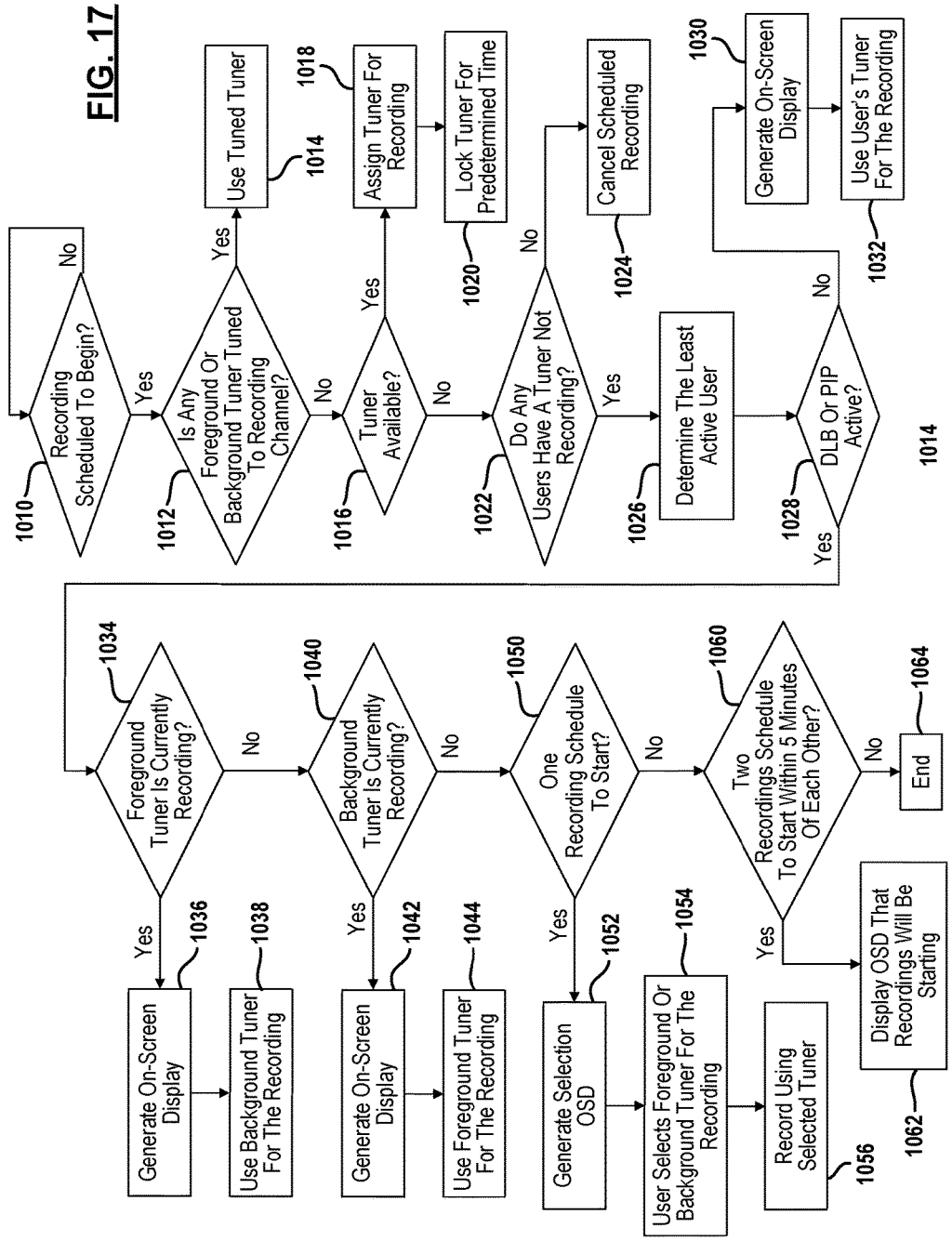
FIG. 17 is a flowchart of a fifth method for assigning the tuner.

Referring now to FIG. 17, a method for resolving tuner resource conflicts is set forth. In step 1010, it is determined whether a scheduled recording is beginning. If a scheduled recording is not beginning, this method is not applicable and step 1010 is again performed. When a recording is scheduled to begin in step 1010, step 1012 is performed. In step 1012, if a foreground or background tuner of any user is tuned to the channel to be recorded in the recording request, step 1014 uses the already tuned tuner to perform the recording. Thus, either the foreground tuner or background tuner that is tuned to that channel is used in step 1014. Referring back to step 1012, when a foreground tuner or background tuner is not tuned to the channel for recording, step 1016 determines whether a tuner is available, and not currently recording or dedicated to any user. If a tuner is available, a tuner may be assigned in step 1018 and locked for a predetermined amount of time in step 1020. The locking of a tuner for a predetermined amount of time is optional.

Referring back to step 1016, if a tuner is not available, step 1022 determines whether any user has at least one tuner that is not recording. If all tuners are recording, then the scheduled recording is cancelled in step 1024. If step 1022 determines that there are users with at least one tuner that is not recording, then 1026 is performed which assigns the scheduled recording to the least active of those users. Step 1026 may determine the least active of those users based on the amount of time since a remote control action. Alternately, step 1026 may use another suitable criterion of user activity.

Referring back to step 1026, when the least active user is determined, such user having at least one tuner that is not recording, step 1028 now determines whether dual live buffers (DLB) or picture-in-picture (PIP) is active at that user. If dual live buffers or picture-in-picture is not active in step 1028, then an on-screen display may be generated in step 1030 and the user's tuner may be used for recording in step 1032. The on-screen display in step 1030 notifies the user, and may optionally allow the user to cancel the scheduled recording, in which case step 1032 is not performed.

Referring back to step 1028, if dual live buffers or picture-in-picture is active, step 1034 is performed. Dual live buffers or picture-in-picture being active requires two tuners dedicated to a client device. As determined in step 1022, at least one of these two tuners is not currently being used for a recording, and may be used for the scheduled recording.

Step 1034 determines whether the foreground tuner is currently and will still be recording and the dual live buffer remains active. If the foreground tuner is currently tuned and will still be recording and the dual live buffer is active, step 1036 generates an on-screen display and the background tuner may be used for recording in step 1038. The on-screen display in step 1036 may optionally allow the user to cancel the scheduled recording, in which case step 1038 is not performed.

Referring back to step 1034, when the foreground tuner is or will not still be recording and the DLB may not be active, step 1040 may be performed. In step 1040, it is determined whether the background tuner is currently and will be recording when an event is to start. If the background tuner is currently and will be recording, an on-screen display may be generated that asks whether the foreground tuner should be used in step 1042. In step 1044, the foreground tuner may be selected for recording the event.

Referring back to step 1040, when the background tuner is not currently or will not be currently recording when the event is to start, step 1050 is performed. In step 1050, it is determined whether the foreground and the background tuner will be available at the start of the event and only one recording is scheduled. If only one recording is scheduled and the foreground and background tuner will be available at the start of the event, step 1052 may generate an on-screen display selection so that the user of the client device may select the foreground tuner or background tuner for an event in step 1054. The generation of an on-screen display is optional. The recording is then recorded in step 1056 using the selected tuner. The on-screen display in step 1052 may optionally also allow the user to cancel the scheduled recording, in which case steps 1054 and 1056 are not performed.

Referring back to step 1050, if the foreground tuner and background tuner will be available at the start will not be available at the start time and more than one recording is scheduled, step 1060 may determine whether two recordings are scheduled to start within five minutes of each other. In step 1062, an on-screen display may be generated that states that the recordings will be started. In step 1060, if two recordings are not scheduled to start within five minutes of each other, the tuners may be assigned as described above. This may entail an on-screen display selection or merely assigning available tuners to the recording events.

Figure 18:
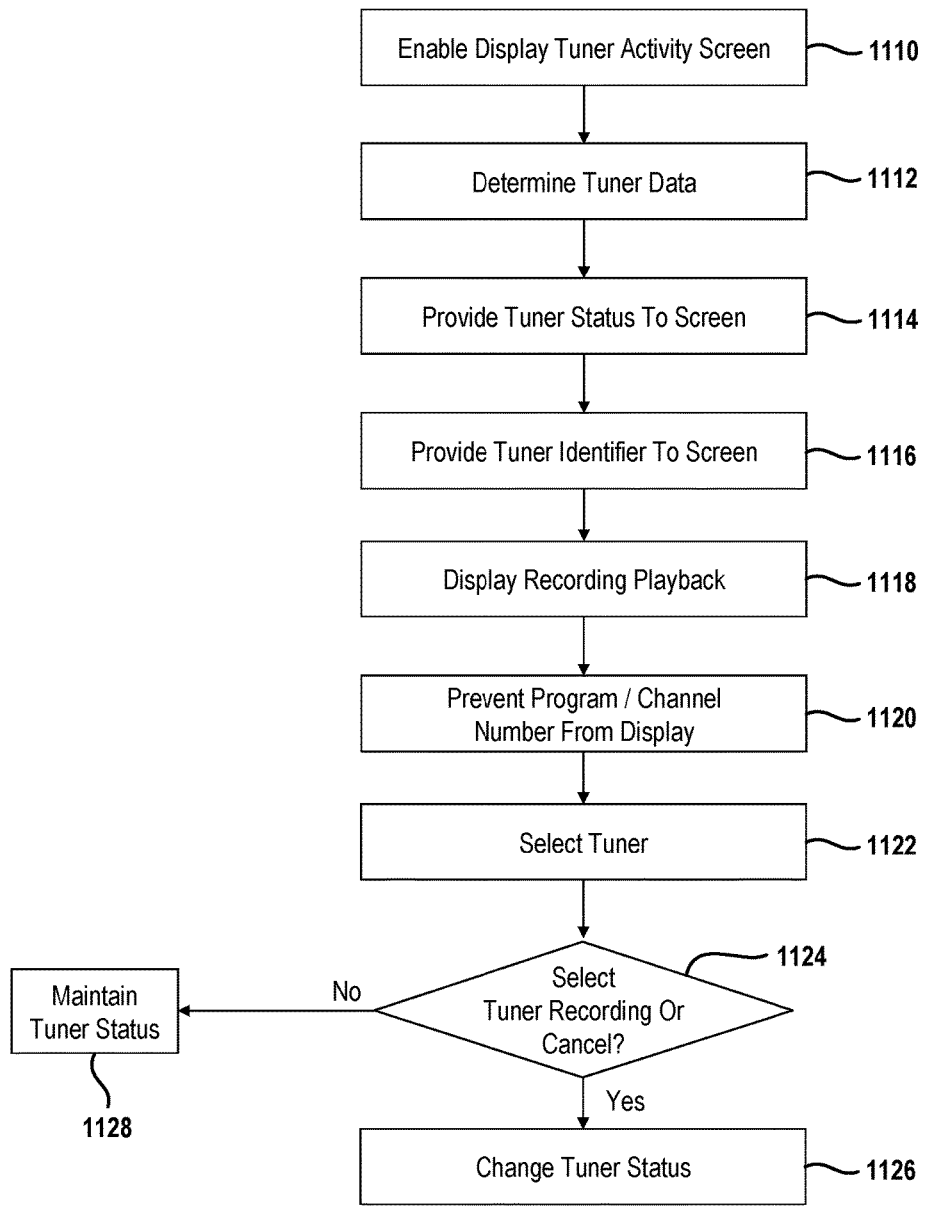
FIG. 18 is a flowchart of a sixth method for assigning the tuner.

Referring now to FIG. 18, a description for a user resolving conflicts between tuner activities is set forth. In step 1110, the display may be used to display a tuner activity screen such as those illustrated in FIGS. 14 and 15. In step 1112, tuner data may be determined for the display. A tuner status may also be generated within the tuner activity screen in step 1114. In step 1116, a tuner identifier is generated on the screen. The tuner identifier may have a numerical identifier or a common identifier such as "living room, my location, bedroom one, bedroom two, or the like." In step 1118, a recording playback indicator may also be provided. If one device is playing back a recording, the recording may be joined. In step 1120, a program or channel number may be prevented from being displayed on a tuner or a conflict display in step 1120. This allows privacy between various client devices. A live program can thus not be joined by another client device. In step 1122, a tuner may be selected to cancel the recording upon the tuner conflict screen. If a tuner has been selected for recording or cancelling, the tuner status is changed in step 1126. In step 1124, if a tuner has not been selected for recording or cancelling, step 1128 maintains the tuner status of the tuners.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
allocating, at a server device, a first tuner of a plurality of television (TV) tuners to a first client device;
generating a tuner request at a second client device corresponding to a live TV request;
communicating the tuner request for live television from the second client device to the server device;
identifying a conflict at a resource manager of the server device based on the tuner request;
generating a set of sufficient sets comprising conflicting events based on the conflict at the resource manager, said conflicting events comprising a tuner activity or tuner activities that, when one of the sufficient sets is cancelled, would provide a solution to the conflict, at least one of the sufficient sets comprising a pair of programs;
prioritizing the sufficient sets;
sorting, at a conflicts resolver module, the sufficient sets within the second client device based on type value, priority value and sub-priority value to form a sorted set;
displaying the sorted set of the sufficient sets on a conflict display associated with the second client device;
selecting one of sufficient sets of the sorted set to form a set selection;
communicating the set selection to the resource manager;
cancelling the tuner activity or tuner activities associated with the set selection;
reallocating the first tuner to the second client device in response to the tuner request after cancelling; and
communicating a content signal through the first tuner to the second client device.

2. A method as recited in claim 1 wherein allocating a first tuner of a plurality of tuners comprises allocating the first tuner of the plurality of tuners located within a server device that is in communication with the first client device and the second client device.

3. A method as recited in claim 1 wherein allocating a first tuner of a plurality of tuners comprises allocating the first tuner of the plurality of tuners located within a satellite signal-receiving server device that is in communication with the first client device and the second client device.

4. A method as recited in claim 1 wherein generating a tuner request comprises a recording request at the second client device.

5. A method as recited in claim 1 wherein generating a tuner request comprises a picture-in-picture request at the second client device.

6. A method as recited in claim 1 wherein generating a tuner request comprises a dual live buffer request at the second client device.

7. A method as recited in claim 1 wherein reallocating comprises automatically reallocating the first tuner based on a priority of the tuner request.

8. A method as recited in claim 1 wherein reallocating comprises automatically reallocating the first tuner based on a least active tuner.

9. A method as recited in claim 1 further comprising identifying a conflict at the server device based on the tuner request.

10. A method as recited in claim 1 further comprising communicating the sorted set from the conflicts resolver module to the resource manager, said resource manager reallocating the first tuner based on the sorted set.

11. A method as recited in claim 10 further comprising communicating the sorted set from the conflicts resolver module to the resource manager, said resource manager generating a tuner activity display based on the sorted set.

12. The method as recited in claim 1 wherein the tuner request comprises a dual live buffer request.

13. The method as recited in claim 1 wherein the tuner request comprises a picture-in-picture request.

14. A method comprising:
allocating, at a server device, a first tuner of a plurality of television (TV) tuners to a first client device;
generating a tuner request at the first client device corresponding to a live TV request;
communicating the tuner request for live television from the first client device to the server device;
identifying a conflict at a resource manager of the server device based on the tuner request;
generating a set of sufficient sets comprising conflicting events based on the conflict at the resource manager, said conflicting events comprising a tuner activity or tuner activities that, when one of the sufficient sets is cancelled, would provide a solution to the conflict, at least one of the sufficient sets comprising a pair of programs;
prioritizing the sufficient sets;
sorting, at a conflicts resolver module, the sufficient sets within the second client device based on type value, priority value and sub-priority value to form a sorted set;
displaying the sorted set of the sufficient sets on a conflict display associated with the first client device;
selecting one of the sufficient sets of the sorted set to form a set selection;
communicating the set selection to the resource manager;
cancelling the tuner activity or tuner activities associated with the set selection;
allocating a second tuner to the first client device; and
communicating a content signals through the first tuner and the second tuner to the first client device.

15. A method as recited in claim 14 further comprising generating a second tuner request at a second client device and communicating the second tuner request to the server device; allocating a third tuner to the second client device in response to the second tuner request.

16. A method as recited in claim 15 further comprising recording content at the server device using the third tuner.

17. A method as recited in claim 14 wherein allocating a first tuner of a plurality of tuners comprises allocating the first tuner of the plurality of tuners located within a server device that is in communication with the first client device and a second client device.

18. A method as recited in claim 14 wherein allocating a first tuner of a plurality of tuners comprises allocating the first tuner of the plurality of tuners located within a satellite signal-receiving server device that is in communication with the first client device and a second client device.

19. A method as recited in claim 14 wherein generating a tuner request comprises a recording request.

20. A method as recited in claim 14 wherein generating a tuner request comprises a picture-in-picture request at the first client device.

21. A method as recited in claim 14 wherein generating a tuner request comprises a dual live buffer request at the first client device.

22. A method as recited in claim 14 further comprising generating a selection signal at the first client device and communicating the selection signal to the server device.

23. A method as recited in claim 14 wherein allocating comprises automatically allocating the second tuner based on a priority of the tuner request.

24. A method as recited in claim 14 wherein allocating comprises automatically allocating the second tuner based on a least active tuner.

25. A method as recited in claim 14 further comprising identifying a conflict at the server device based on the tuner request.

26. A method as recited in claim 14 further comprising communicating the sorted set from the conflicts resolver module to the resource manager, said resource manager allocating the second tuner based on the sorted set.

27. A method as recited in claim 26 further comprising communicating the sorted set from the conflicts resolver module to the resource manager, said resource manager generating a tuner activity display based on the sorted set.

28. A system comprising:
a server device having a resource manager and a plurality of tuners therein;
a first client device in communication with the server device and allocated at least a first television (TV) tuner from the plurality of tuners; and
a second client device in communication with the server device that generates a tuner request corresponding to a live request;
said server device identifying a conflict at a resource manager of the server device based on the tuner request, generating a set of sufficient sets comprising conflicting events based on the conflict at the resource manager, said conflicting events comprising a tuner activity or tuner activities that, when one of the conflicting events is cancelled, would provide a solution to the conflict, at least one of the sufficient sets comprising a pair of programs, prioritizing the conflicting events, sorting, at a conflicts resolver module, the conflicting events based on type value, priority value and subpriority value prior to forming a sorted set, displaying the sorted set of conflicting events on a conflict display associated with the second client device, receiving a set selection from the second client device corresponding to one of the sufficient sets at the resource manager, cancelling the tuner activity or tuner activities associated with the set selection, allocating the first television tuner to the second client device and communicating a content signal through the first television tuner to the second client device.

29. A system as recited in claim 28 wherein the server device comprises a satellite signal-receiving server device that is in communication with the first client device and the second client device.

30. A system as recited in claim 28 wherein the tuner request comprises a recording request.

31. A system as recited in claim 28 wherein the tuner request comprises a picture-in-picture request.

32. A system as recited in claim 28 wherein the tuner request comprises a dual live buffer request.

33. A system as recited in claim 28 further comprising a conflict resolver forming a sorted set from the set of sufficient sets.

34. A system as recited in claim 33 wherein said resource manager reallocates the first television tuner based on the sorted set.

35. A system as recited in claim 34 wherein said resource manager generates a tuner activity display based on the sorted set.

36. A system comprising:
a server device having a resource manager and a plurality of tuners therein;
a first client device in communication with the server device and allocated at least a first television (TV) tuner from the plurality of tuners; and
said first client device generating a tuner request corresponding to a live TV request;
said server device identifying a conflict at a resource manager of the server device based on the tuner request, generating a set of sufficient sets comprising conflicting events based on the conflict at the resource manager, said conflicting events comprising a tuner activity or tuner activities that, when one of the conflicting events is cancelled, would provide a solution to the conflict, at least one of the sufficient sets comprising a pair of programs, prioritizing the conflicting events, sorting, at a conflicts resolver module, the conflicting events based on type value, priority value and subpriority value prior to forming a sorted set, displaying the sorted set of conflicting events on a conflict display associated with the first client device, receiving a set selection from the first client device corresponding to one of the sufficient sets at the resource manager, cancelling the tuner activity or tuner activities associated with the set selection, allocating at least a second television (TV) tuner from the plurality of tuners in response to the tuner request;
said server communicating a content signals through the first television tuner and the second television tuner to the first client device.

37. A system as recited in claim 36 further comprising a second client device generating a second tuner request and communicating the second tuner request to the server; said server allocating a third tuner to the second client device in response to the second tuner request.

38. A system as recited in claim 36 wherein the tuner request comprises a recording request.

39. A system as recited in claim 36 wherein the tuner request comprises a picture-in-picture request at the first client device.

40. A system as recited in claim 36 wherein the tuner request comprises a dual live buffer request at the first client device.

41. A system as recited in claim 36 wherein said resource manager allocates the second television tuner based on the sorted set.

42. A system as recited in claim 41 wherein said resource manager generates a tuner activity display based on the sorted set.

* * * * *